Feb. 22, 1966 L. DUBIN 3,236,296

HEAT EXCHANGER

Filed June 21, 1961

2 Sheets-Sheet 1

INVENTOR.
LESTER DUBIN
BY
Morgan, Finnegan, Durham & Pine
ATTORNEYS.

Feb. 22, 1966 L. DUBIN 3,236,296
HEAT EXCHANGER
Filed June 21, 1961 2 Sheets-Sheet 2

INVENTOR.
LESTER DUBIN
BY
Morgan, Finnegan, Durham & Pine
ATTORNEYS.

United States Patent Office 3,236,296

Patented Feb. 22, 1966

3,236,296

HEAT EXCHANGER

Lester Dubin, Pelham Manor, N.Y., assignor to Lambda Electronics Corporation, Huntington, N.Y., a corporation of New York Filed June 21, 1961, Ser. No. 118,638
7 Claims. (Cl. 165—80)

This invention relates to heat exchangers and more particularly to exchangers for transferring heat from electrical equipment.

A wide variety of heat exchangers are currently in use in the electronic packaging art, these exchangers being employed to dissipate heat generated by electrical components. The effective dissipation of heat in such arrangements is important as it affects the stability and operating capacity of many electrical components. In addition, effective heat dissipation permits maximum density in the packaging of electrical components, and this is particularly important in many applications where space is at a premium. The advent of solid state devices such as transistors and the increasing emphasis on miniaturization has placed greater demands on heat exchange units. This has reached the point where conventional exchangers are no longer adequate in many applications.

It is accordingly an object of the invention to provide improved heat exchange means for electronic equipment.

A still further object of the invention is to provide heat exchange means for electronic equipment which are simply fabricated, readily assembled, and not burdened by the many limitations which characterize the casting art.

A still further object of the invention is to provide a heat exchanger adapted to dissipate heat by convection, conduction and radiation while serving at the same time as a support for electronic components such as transistors.

A still further object of the invention is to provide a heat exchanger which provides an unusually large degree of heat transfer in comparison with the volume occupied by the exchanger.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention comprises a base member which also serves as a support for electronic components, a plurality of radiation plate forming means, the plate forming means including guide means which cooperate with mating guide means in said base member thus permitting the location and registration of the plate forming means in the structure defined by the base member. A cover assembly is also provided which engages the base member and plate forming means thus providing additional structural integrity in the exchanger.

The invention consists in the novel parts, constructions, arrangements, combinations, improvements, methods, steps and procedures herein shown and described.

An exemplary embodiment of the invention is illustrated in the drawings of which:

Figures 1, 3:
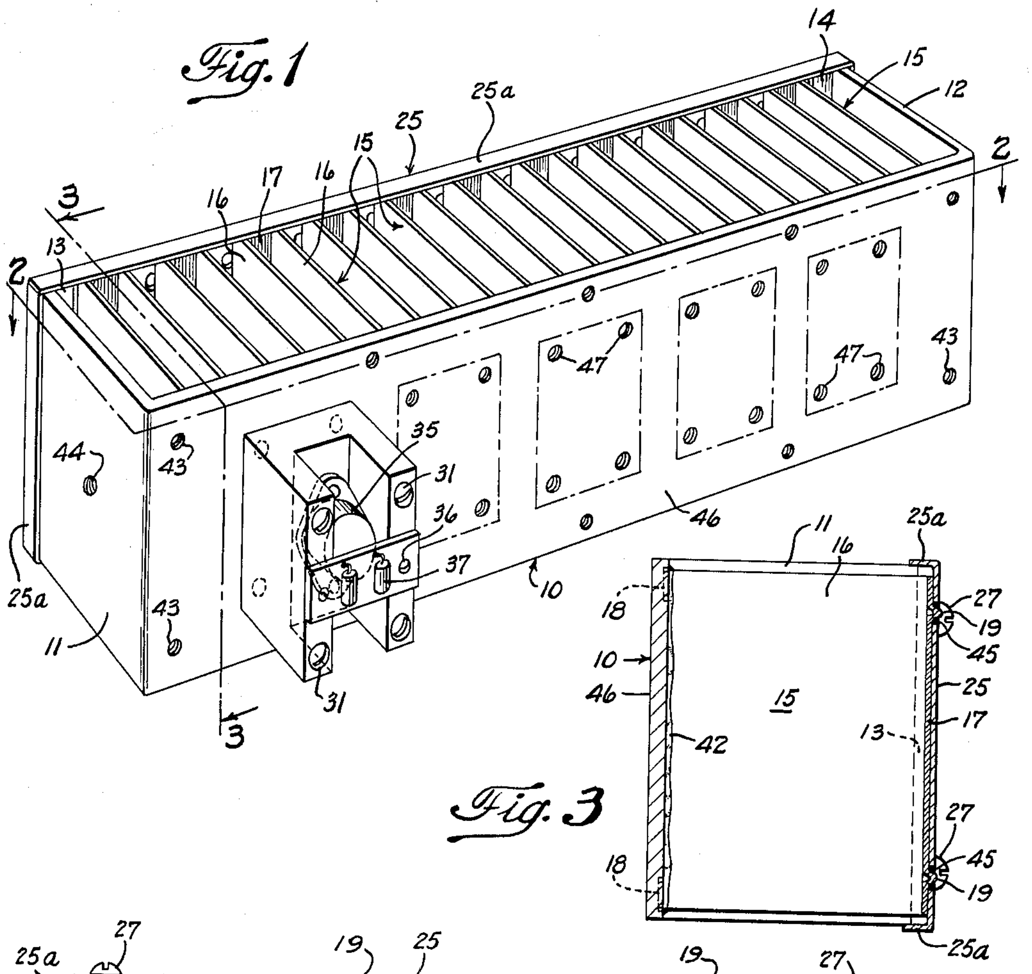
FIGURE 1 is a perspective view illustrating the entire heat exchanger together with an electronic assembly mounted thereon.
FIGURE 3 is an end elevation view partly in section taken along the lines 3—3 of FIGURE 1.
Figure 2:
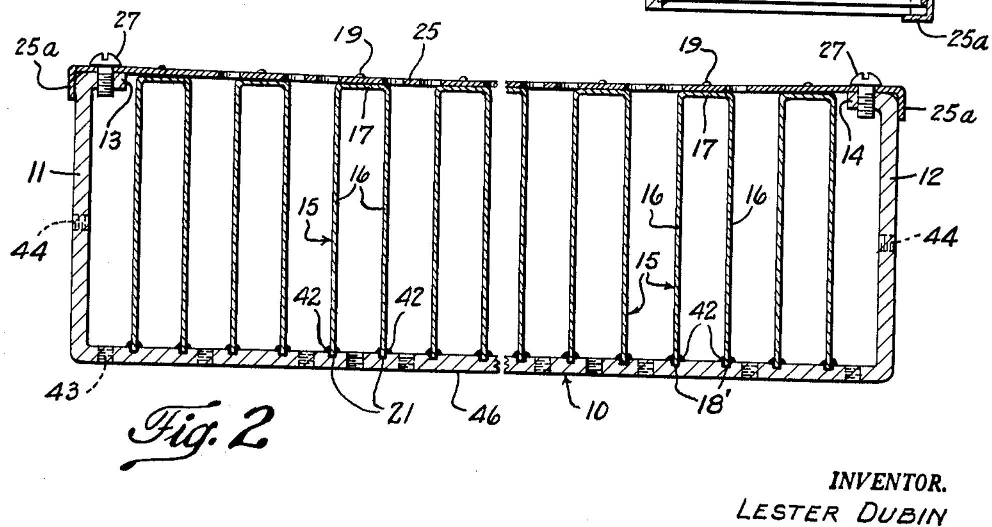
FIGURE 2 is a plan view partly in section taken along the lines 2—2 of FIGURE 1.
Figure 5:
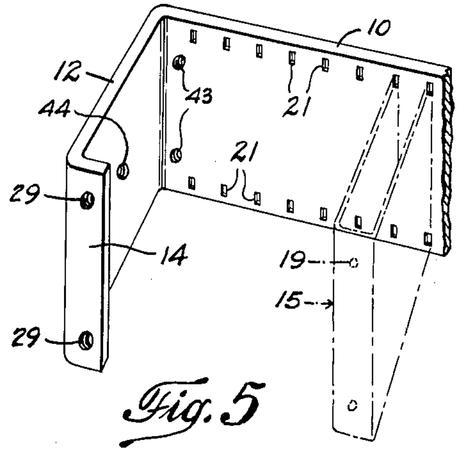
FIGURE 5 is a perspective, fragmentary view of the base member of the exchanger together with one of the plate-forming means shown in phantom.
Figure 6:
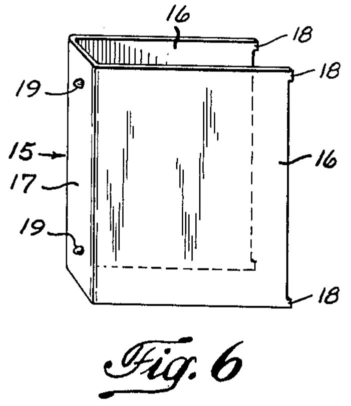
FIGURE 6 is a perspective view of one of the plate forming means.

The exchanger according to the invention comprises a base member 10 having orthogonal sides 11 and 12 integral therewith. The distal ends of sides 11 and 12 are turned inwardly to form flange sections 13 and 14, respectively. Adapted to cooperate with base member 10 are a cover 25 and a plurality of plate-forming means 15 in the shape of channel members each having sides 16 and an integral bridge section 17. Integral with each side 16 and depending therefrom are a pair of guide lugs 18 (FIGURES 2, 3 and 6). These lugs are adapted to be inserted in corresponding depressions 21 in base member 10 (FIGURE 5). When the plate members 15 are so disposed, they form a plurality of parallel fins or plates, each plate comprising the side 16 of the respective plate-forming member. The spacing between adjacent plate-forming means 15 is approximately equal to the spacing between the sides 16 of one of the plate-forming means so that the resultant fins are substantially equally spaced along the entire length of base member 10.

Figure 4:
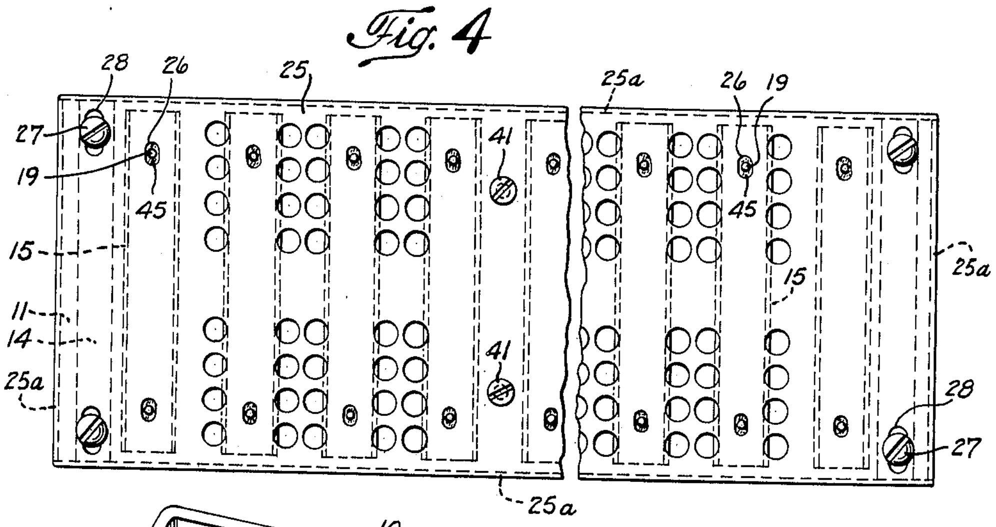
FIGURE 4 is an elevation view illustrating the heat exchanger as seen from the rear of FIGURE 1.

Besides integral guide lugs 18 each plate-forming member 15 has extending orthogonally from its respective bridge section 17 a pair of nipples 19. These nipples are embossed in bridge section 17 and are aligned with apertures 26 (FIGURE 4) in cover plate 25. The latter also includes additional perforations 23 and is mounted over the open section of base member 10, being seated on flanges 13 and 14 and secured thereto by means of screws 27 which pass through apertures 28 in the cover plate and are threadably inserted in tapped holes 29 (FIGURE 5) in the base flange sections 13 and 14. As is evident in FIGURES 1 and 2, cover plate 25 aids in confining the plate-forming members 15 in their spaced, parallel disposition along base 10.

The components described thus far are preferably of copper but may also be brass or tin plated steel. The components are produced preferably in the following manner: Cover 25, derived from stock in any acceptable manner, is subjected to a punching operation to form the various perforations therein, and to a bending operation to form the four sides 25*a* thereof. The corners of plate 25 are initially notched in a die to facilitate the formation of the sides 25*a*.

The base member 10, preferably sheared from stock, is subjected to a bending operation to form sides 11 and 12 and is additionally drilled and tapped to provide the various mounting holes therein. The depressions 21 are formed by a cold forging, e.g., stamping operation, and the flanges 13 and 14 are formed by bending.

The formation of the plate-forming members 15 is accomplished by a bending operation to form the sides 16 thereof, by an embossing operation to form the nipples 19 and by a notching operation to cut out the space between lugs 18. It may be seen from the above that inexpensive mass production techniques are employed in the formation of the exchanger components.

Assembly of the components of the exchanger is accomplished as follows:

(1) The plate members 15 are inserted in the base 10 with the guide lugs 18 being disposed in the depressions 21.

Figure 7:
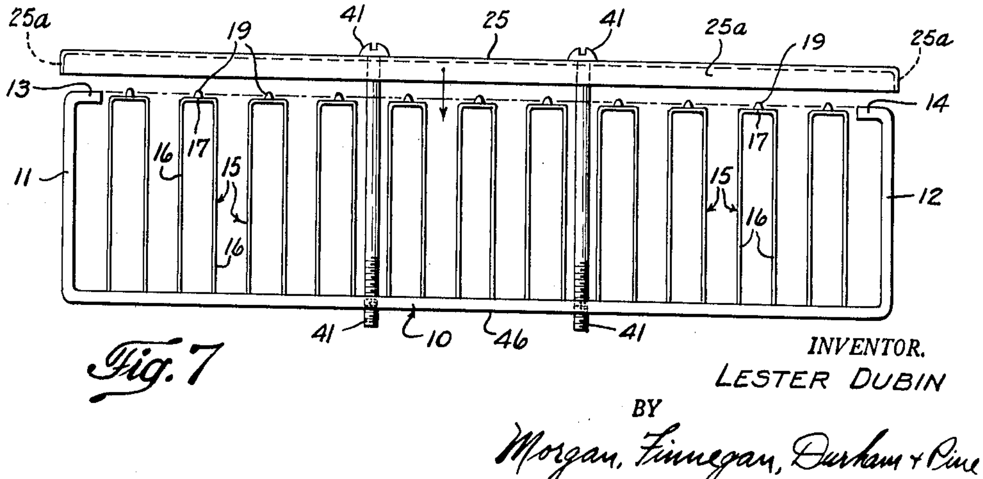
FIGURE 7 is a view of the heat exchanger showing the relationship among the elements during one stage of the assembly thereof.

(2) After the plate-forming members 15 have been registered in and mounted on base 10, as seen in FIGURE 7, cover 25 is placed over this assembly and the holes 26 therein aligned with the nipples 19 in the members 15.

(3) Thereafter the cover may be fastened to the base by means of screws 27.

(4) In order to temporarily clamp members 15 to base 10 and to bring cover 25 into intimate contact with the bridge sections 17 of members 15, the cover is urged in the direction of the members 15 and held there by suitable temporary clamping means such as screws 41 (FIGURE 7). These pass through holes in the cover and are threadably inserted in tapped holes in base member 10. In this connection it is noted that sides 11 and 12 of the base extend outward therefrom to a greater degree than do the sides 16 of the channel members 15. Thus when cover plate 25 is clamped by means of screws 41, it presents a slightly bowed appearance. This more readily accomplishes the necessary contact between the cover and the plate-forming members.

(5) The unit thus assembled is de-greased.

(6) After de-greasing the exchanger is heated to a temperature sufficient for a soldering operation and strips of solder are brought into contact with the base member in the region of guide lugs 18 and depressions 21. The assembly is slightly tilted so that when the solder softens it runs along the corners defined by each side 16 and base member 10. The resulting fillets 42 may be seen in FIGURES 2, 3. This soldering operation provides a complete high-conductivity thermal connection between the base 10 and each fin 16. With the assembly still heated solder is also applied in the region of the apertures 26 and nipples 19, thus forming a soldered connection 45 between the cover 25 and the fins 16. Thereafter the temporary mounting screws 41 are removed.

(7) Finally a black wrinkle finish is provided on all surfaces except surface 46 of base 10.

In use the base member 10 provides a mounting surface for suitable electronic equipment such as a plurality of modules 30, FIGURE 1 (only one shown). These modules 30 of a metal such as aluminum carry electronic components such as transistors 35, a terminal board 36 and resistors, condensers, etc., 37. The module 30 is secured to base 10 by means of screws 31 which pass through holes in the sides of the modules and into tapped holes 47 in the base. The entire exchanger may be connected in turn to a chassis or other structure by means of studs or bolts which engage holes 43 in the base. Holes 44 for a similar purpose or for the mounting of other components are also provided.

In operation heat generated by the electrical components is transferred principally by conduction to base 10 and thence to fins 16, also by conduction. This heat is transferred in turn to the surrounding medium from fins 16 by means of conduction, radiation and convection. The convection may be natural or forced and the fins are accordingly arranged preferably in vertical planes to facilitate one or all of these modes. It may be seen from the foregoing that a compact, highly efficient exchanger may be produced and assembled by and large by inexpensive mass production techniques. The exchanger according to the invention has proved to be extremely efficient in a number of applications including the cooling of electronic power supplies.

The invention in its broader aspects is not limited to the specific elements, steps, methods, compositions, combinations and improvements shown and described, but departures may be made therefrom within the scope of the accompanying claims without departing from the principles of the invention and without sacrificing its chief advantages.

What is claimed is:

1. A heat exchanger comprising a heat generating electronic component; a heat conducting metallic base member thermally coupled to said heat generating electronic component but electrically isolated therefrom, said base member including a plurality of parallel guide slots therein; at least one heat conducting channel shaped member including side sections forming heat dissipating plates and a bridge section joining said side sections; the free ends of said side sections being located in said guide slots so as to position said channel member relative to said base member; a plurality of fusible metal junctions permanently securing said channel member to said base member in a thermally conductive relationship, whereby fluid passages exist adjacent said heat dissipating plates.

2. A heat exchanger according to claim 1 further comprising a metallic support member secured to said base member and adapted to mount said heat generating electronic component and thermally couple the same to said base member.

3. A heat exchanger comprising a heat generating electronic component; a heat conducting metallic base member thermally coupled to said heat generating electronic component but electrically isolated therefrom, said base member including a plurality of parallel guide slots therein; a plurality of channel shaped members each including a pair of spaced apart side sections forming heat dissipating plates and a bridge section joining said side sections, the free ends of said side sections being located in said guide slots to position said channel members relative to said base member with the heat dissipating plates being disposed orthogonally with respect to said base member so that fluid passages exist adjacent said heat dissipating plates; a plurality of fusible metal junctions permanently securing said channel members to said base member in a thermally conducting relationship; at least one planar metallic member having a plurality of apertures therein; each of said bridge sections including at least one projection adapted to cooperate with one of said apertures; and a second plurality of fusible metal junctions securing said planar member to said channel member.

4. A heat exchanger in accordance with claim 1 wherein said base member and said channel member are constructed from copper.

5. A heat exchanger in accordance with claim 1 wherein said guide slots traverse only a portion of the width of said base member and wherein the free ends of said side sections include extensions located in said guide slots, the remainder of said free ends abutting the normal surface of said base member.

6. A heat exchanger in accordance with claim 3 wherein said base member includes orthogonally extending portions, and wherein said planar member is secured to the free ends of said orthogonally extending portions.

7. A heat exchanger in accordance with claim 3 wherein said guide slots traverse only a portion of the width of said base member and wherein the free ends of said side sections include extensions located in said guide slots, the remainder of said free ends abutting the normal surface of said base member.

References Cited by the Examiner

UNITED STATES PATENTS

| | | | |
|---|---|---|---|
| 1,313,730 | 8/1919 | Pease | 165—166 |
| 2,471,011 | 5/1949 | Shapiro | 317—100 |

(Other references on following page)

UNITED STATES PATENTS

| | | | |
|---|---|---|---|
| 2,549,466 | 4/1951 | Hoheisel | 29—157.3 |
| 2,656,158 | 10/1953 | Hudson et al. | 29—157.3 |
| 2,784,947 | 3/1957 | Peterson | 257—245 |
| 2,818,237 | 11/1957 | Lehr et al. | 165—80 |
| 2,874,941 | 2/1959 | Woolard et al. | 257—245 |
| 2,958,515 | 11/1960 | Booker | 165—80 |
| 2,965,819 | 12/1960 | Rosenbaum | 165—80 X |

| | | | |
|---|---|---|---|
| 3,001,102 | 9/1961 | Stiefel et al. | 317—99 |
| 3,123,743 | 3/1964 | Perlmutter | 317—101 X |

OTHER REFERENCES

German printed application No. 1,060,487, printed July 1959.

ROBERT A. O'LEARY, *Primary Examiner.*

HERBERT L. MARTIN, CHARLES SUKALO, *Examiners.*